United States Patent
White (10) Patent No.: US 6,749,080 B1
(45) Date of Patent: Jun. 15, 2004

(54) UNDERGROUND UTILITY HOUSING (76) Inventor: Kenneth R. White, 20114 Jordan River Rd., Umatilla, FL (US) 32784-0595

(*) Notice: Subject to any disclaimer, the term of this patent is extended or adjusted under 35 U.S.C. 154(b) by 0 days.

(21) Appl. No.: 10/382,143

(22) Filed: Mar. 5, 2003

(51) Int. Cl.$^7$ .............................................. F16K 35/00
(52) U.S. Cl. ....................... 220/484; 137/371; 137/381; 277/615
(58) Field of Search ......................... 220/484; 137/371, 137/381; 277/615

(56) References Cited

U.S. PATENT DOCUMENTS

| | | |
|---|---|---|
| 1,600,761 A | 9/1926 | Haase |
| 2,018,615 A | 10/1935 | Lofton |
| 3,433,436 A | 3/1969 | Meyer |
| 3,730,213 A | 5/1973 | Bates |
| 3,858,755 A | 1/1975 | Tellen |
| 3,913,400 A | 10/1975 | Floren |
| 3,921,449 A | 11/1975 | Hauffe |
| RE28,640 E | 12/1975 | Sauriol |
| 3,935,736 A | 2/1976 | Enright |
| 3,952,908 A | 4/1976 | Carson |
| 3,961,528 A | 6/1976 | Ford |
| 3,972,440 A | 8/1976 | Warren |
| 4,305,282 A | 12/1981 | Hunt |
| 4,457,517 A | 7/1984 | Dunegan |
| 4,614,113 A | 9/1986 | Daghe et al. |
| 4,669,305 A | 6/1987 | Rivero-Olmedo |
| 4,742,585 A | 5/1988 | Logsdon |
| 4,809,548 A | 3/1989 | Rivero-Olmedo |
| 4,813,281 A | 3/1989 | Daghe |
| 4,872,575 A | 10/1989 | Kobilan |
| 5,249,697 A | 10/1993 | McKinnon |
| 5,333,750 A | 8/1994 | McKinnon |
| 5,392,940 A * | 2/1995 | Pierce ........................ 220/4.33 |
| 5,747,687 A | 5/1998 | Edwards et al. |
| 5,823,577 A | 10/1998 | Johnston |
| 6,164,131 A | 12/2000 | Edwards et al. |
| 6,264,056 B1 * | 7/2001 | King ........................... 220/484 |
| 6,530,576 B1 * | 3/2003 | Earl et al. .................... 277/615 |
| 6,666,349 B1 * | 12/2003 | Gavin ..................... 220/567.1 |

* cited by examiner

*Primary Examiner*—Joseph Man-Fu Moy
(74) *Attorney, Agent, or Firm*—Dennis G. LaPointe; Mason Law, P.L.

(57) ABSTRACT

An adjustable underground utility housing with a lid for access from above ground is disclosed and comprises a housing formed with upstanding wall portions defining a cavity having an upper opening to support a lid and a bottom opening. The housing has utility piping inlet and outlet openings through which the piping enters and exits the housing for servicing a facility. The openings each have flexible closures for preventing dirt from entering the openings into the cavity of the housing. The closures are sufficiently flexible for sliding down over the utility piping yet sufficiently resilient to prevent the dirt from entering the housing cavity. The closures can be formed with overlapping horizontally oriented bristles, with a sheet of rubberized material having a centrally located vertical slit, or with this same sheet of rubberized material with the addition of horizontal slits to form reinforced stiffened fingers.

13 Claims, 7 Drawing Sheets

(PRIOR ART)

UNDERGROUND UTILITY HOUSING

The invention relates to water meter housings for providing protection for below ground devices such as water meters, valves, etc.

Meter boxes are designed to be buried in the ground to house valves, meters, cables, and the like, and to allow access to the interior as needed. Generally, such boxes include fixed openings to allow ingress and egress of utility piping and valves. These openings are not adjustable, and are pre-set to fit over valves and utility piping, leaving gaps between the piping and/or valves and the surrounding environment. An example of such a device is disclosed in U.S. Pat. No. 3,858,755.

The main disadvantages of these types of meter boxes are: 1) the pre-set openings allow dirt and debris to enter the cavity of the box, and 2) the un-adjustability of the openings makes achieving a satisfactory fit over utility piping very difficult. Since the boxes are housed underground, precipitation, such as rain, can liquefy the surrounding dirt, which then allows mud to flow into the box cavity. A resultant build-up of dirt, debris, and mud around the components housed inside the box can contribute to the deterioration and/or possible damage to the utility piping, valves, water meter or other components housed inside the box cavity. Furthermore, when reading the meter, the dirt, mud, and collected debris must be removed by hand so that the meter is exposed and readable.

The instant application solves these problems by having openings with closure means that will substantially provide for a protective barrier around utility piping to keep out dirt, and is adapted to fit piping and other components at any typically contemplated height for such utility services.

The invention is more fully described below.

Figure 1:
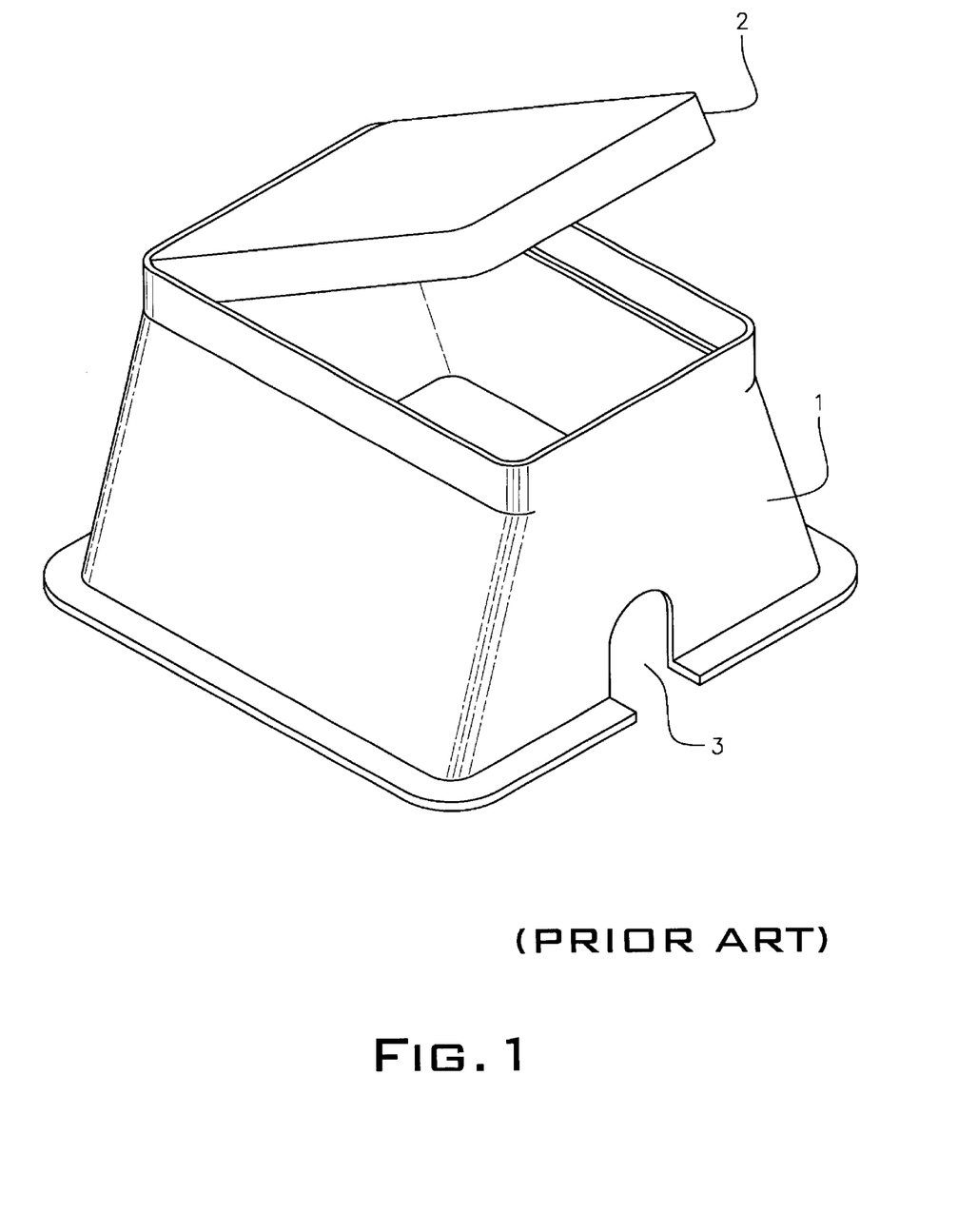
FIG. 1 is an example of a prior art utility service box or housing.
Figure 2:
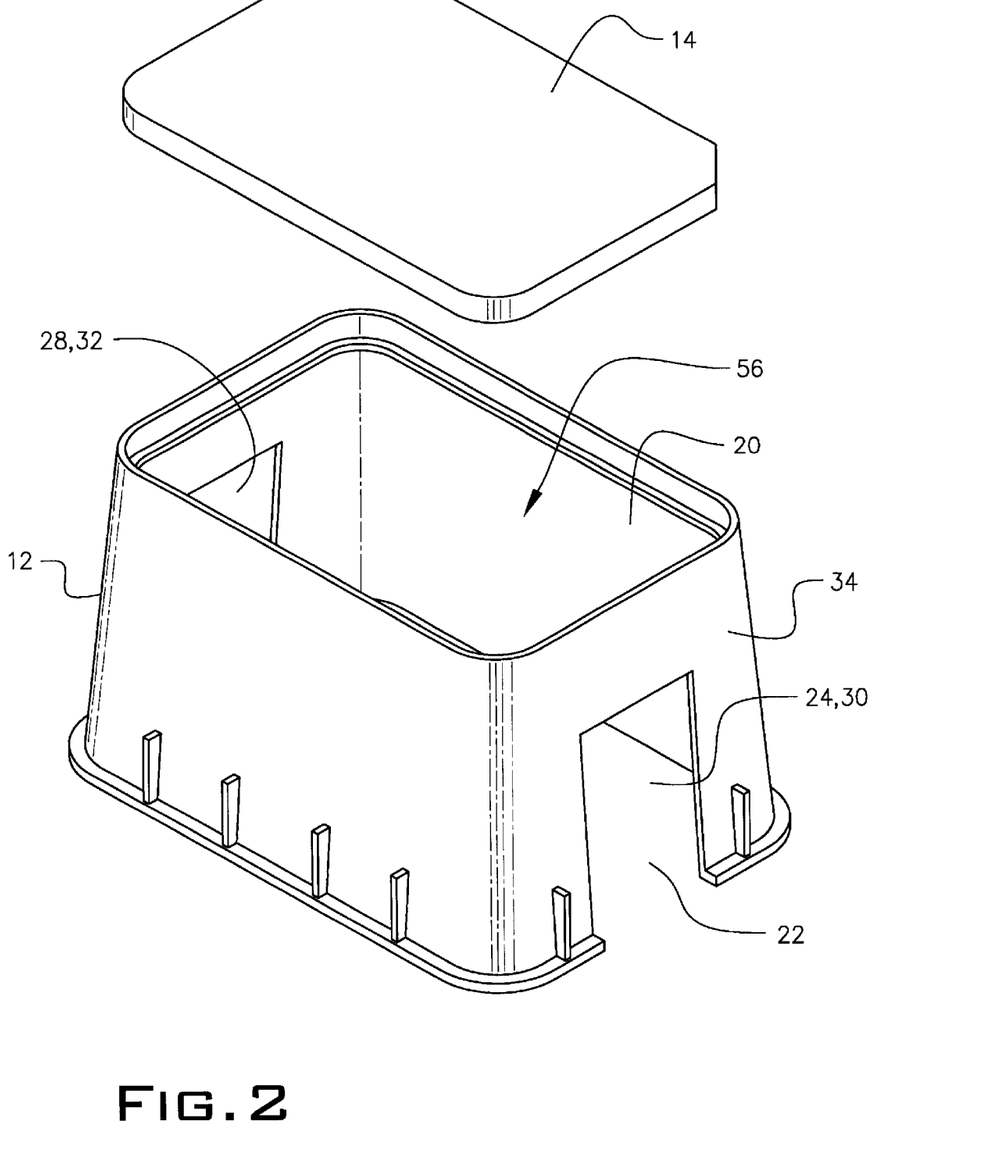
FIG. 2 is a perspective conceptual depiction of a utility housing without the closure means at its openings.

Referring now to the drawings, FIG. 1 is an example of a prior art utility box depicted as 1 with a removable lid 2 and its fixed pre-set aperture or opening 3. If the box is lowered into the ground over the service piping or lines, the opening around such service lines allows for the entry of dirt into the cavity formed by the box. If the service line is a little too high for the box, then the opening 3 has to be cut wider and/or higher thereby resulting in a larger opening through which dirt can enter the cavity of the box.

FIGS. 2 through 6 disclose preferred embodiments of the present invention, which is an adjustable underground utility housing for service lines used to service facilities such as homes and commercial facilities, and is depicted generally as 10.

The invention 10 has a housing 12 formed with upstanding wall portions 18 defining a cavity 56 having an upper opening 20 and a bottom opening 22. The upper opening 20 is typically formed to support and receive a removable lid 14. The housing 12 and its lid are typically referred to as underground utility boxes or service boxes. Most of these utility boxes are made from a variety of materials from metal castings to polymeric materials such as fiber reinforced polymer moldings. The latter are non-corrosive and can be strengthened in a number of ways such as using thicker molded portions or integral stiffening ribs or gussets in the corners and/or sides. The lids on the other hand are typically made of metals castings but can also be made of other load bearing materials. Although vehicles are generally not expected to drive over the covers and boxes, sometimes equipment such as riding lawnmowers may. If the boxes are located near a road side, higher load bearing designs are generally incorporated as it is foreseeable that vehicles such as mail trucks or garbage pickup vehicles may drive on top of the box. The point is that the box is designed to withstand the anticipated load bearings and the invention, which is directed at the adjustable inlet and outlet service line closure features, prevents soil from entering the cavity of the box.

The housing 12 has utility piping inlet means 24 in one of the upstanding wall portions 18 through which, the utility piping 26 enters the housing 12; and utility piping outlet means 28 in another of the upstanding wall portions 18 through which, the utility piping 26 exits the housing 12 for servicing a facility 54, such as a residential home or residential complex or a commercial facility.

The utility piping inlet and outlet means 24,28 comprises respective openings 30,32 formed so as to extend from a bottom edge 34 of the housing 12. These openings 30,32 may typically be about 3 to 5 inches in width and extend upwardly to about 4 inches from an upper edge of the housing's upstanding wall portions 18. Further, if multiple inlets and/or outlets are included in the box, multiple openings 30,32 may be incorporated in the upstanding wall portions 18 to accommodate each service line entering and exiting the utility box.

The utility piping inlet and outlet means 24,28 each have flexible closure means 36 for preventing dirt around an exterior of the housing 12 from entering the inlet and outlet means 24,28 into the cavity 56 formed by the housing's upstanding wall portions 18. The closure means 36 is designed to be sufficiently flexible for sliding down over the utility piping 26 entering and exiting the housing 12, yet sufficiently resilient to prevent the dirt from entering the housing cavity 56. For comparison purposes, if bristles 38 or the like are used, then the bristles 38 could have the consistency of broom floor bristles or a little less than a wire brush. Certainly, there would be a relatively dense number of bristles 38, with two or more layers to provide some depth to the bristles 38. The ends could be crimped into the side edges of the openings or epoxied into the side edges similar to what is done with paint brushes. The idea is to be able to push the box down into the hole in the ground over the utility piping, such that the closure means opens up enough to allow the box to be lowered and the ends of the closure means, such as the bristles 38, flex but provide sufficient resistance against the pipe and above and below the pipe so that dirt in the surrounding exterior of the box can not pass the bristles 38 into the cavity 56 of the box. For purposes of simplicity, the drawings depicting bristle-like features exaggerate spacing between bristles 38 (as well as the size of the bristles), solely for the purpose of emphasizing the bristles 38; but in reality, the depth of the bristles would be relatively dense.

Figure 3:
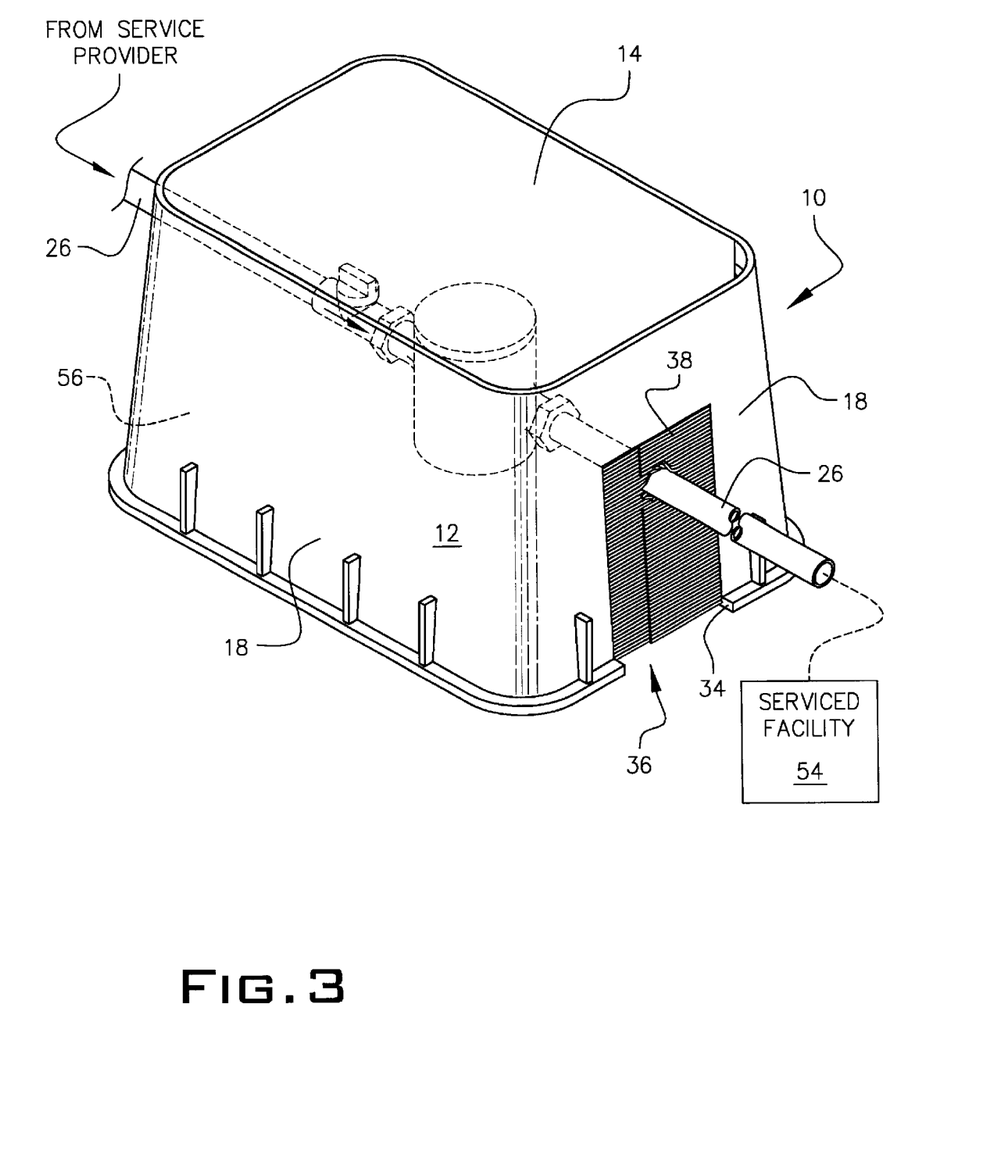
FIG. 3 is a conceptual view of the invention depicting a typical service line shown in phantom running through the box to service a facility.
Figure 4:
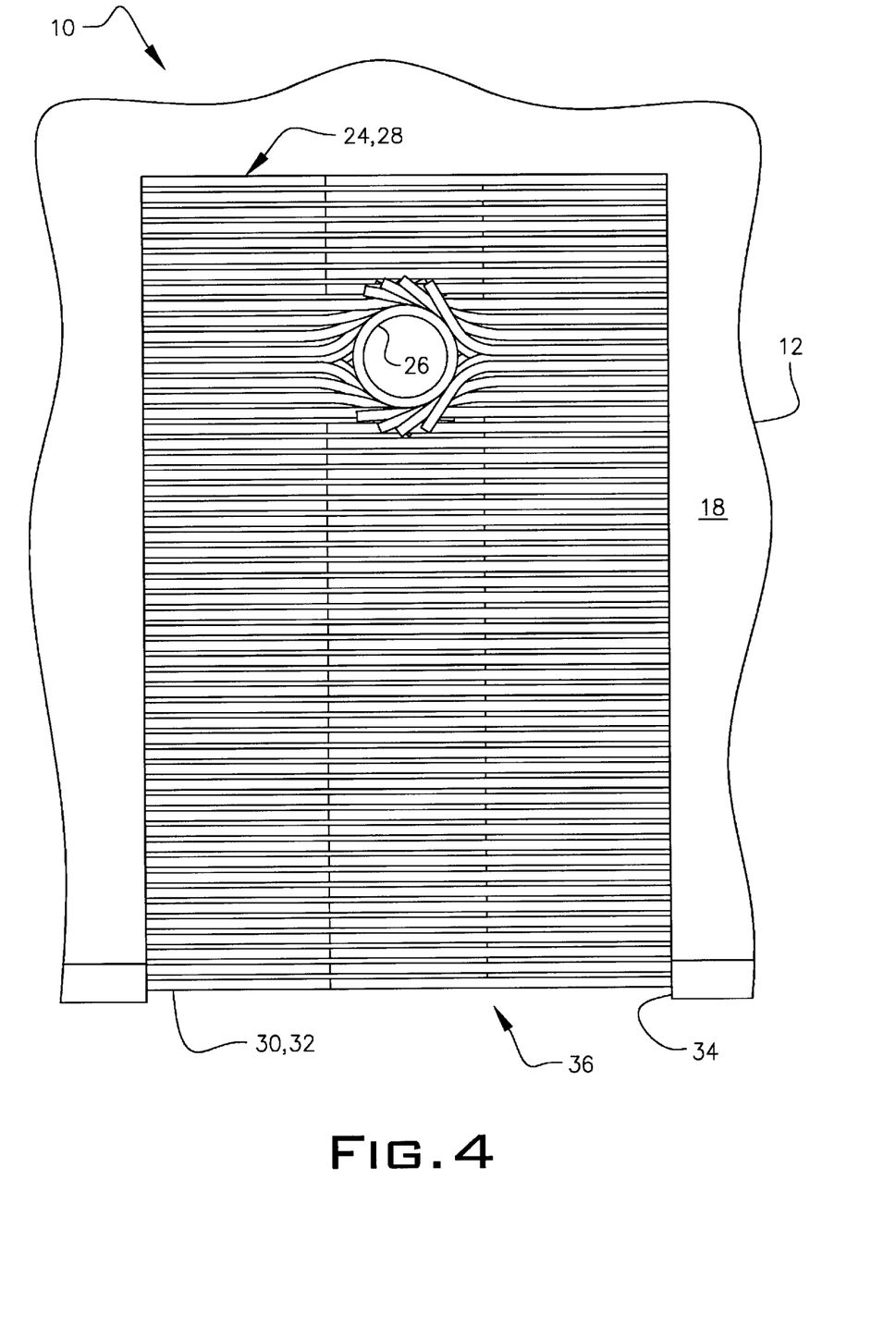
FIG. 4 is a conceptual depiction of one embodiment of the invention wherein the closure means utilizes overlapping bristles.
Figure 6:
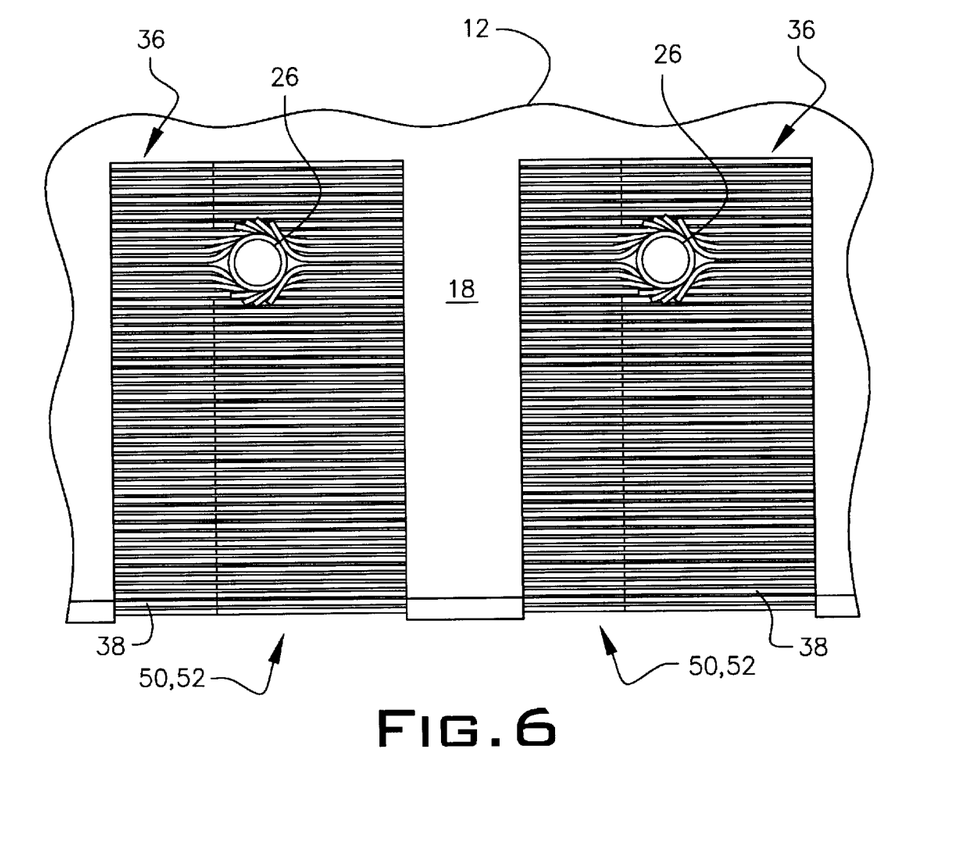
FIG. 6 is a conceptual depiction of another embodiment of the invention depicting the use of two openings representative of two outlet and/or two inlet openings in the box upstanding walls.

The plurality of bristles 38 depicted in FIGS. 3, 4 and 6 are fixed on each side of each opening 30,32. The bristles 38 extend laterally toward the opposite side of each respective opening 30,32 and are of sufficient length such that free ends of the bristles 38 preferably overlap the opposite directed bristles 38. The free ends of the bristles 38 are anticipated to overlap each other by about ½ inch to about 1¾ inches, preferably about 1 inch to about 1½ inches.

Figure 5A:
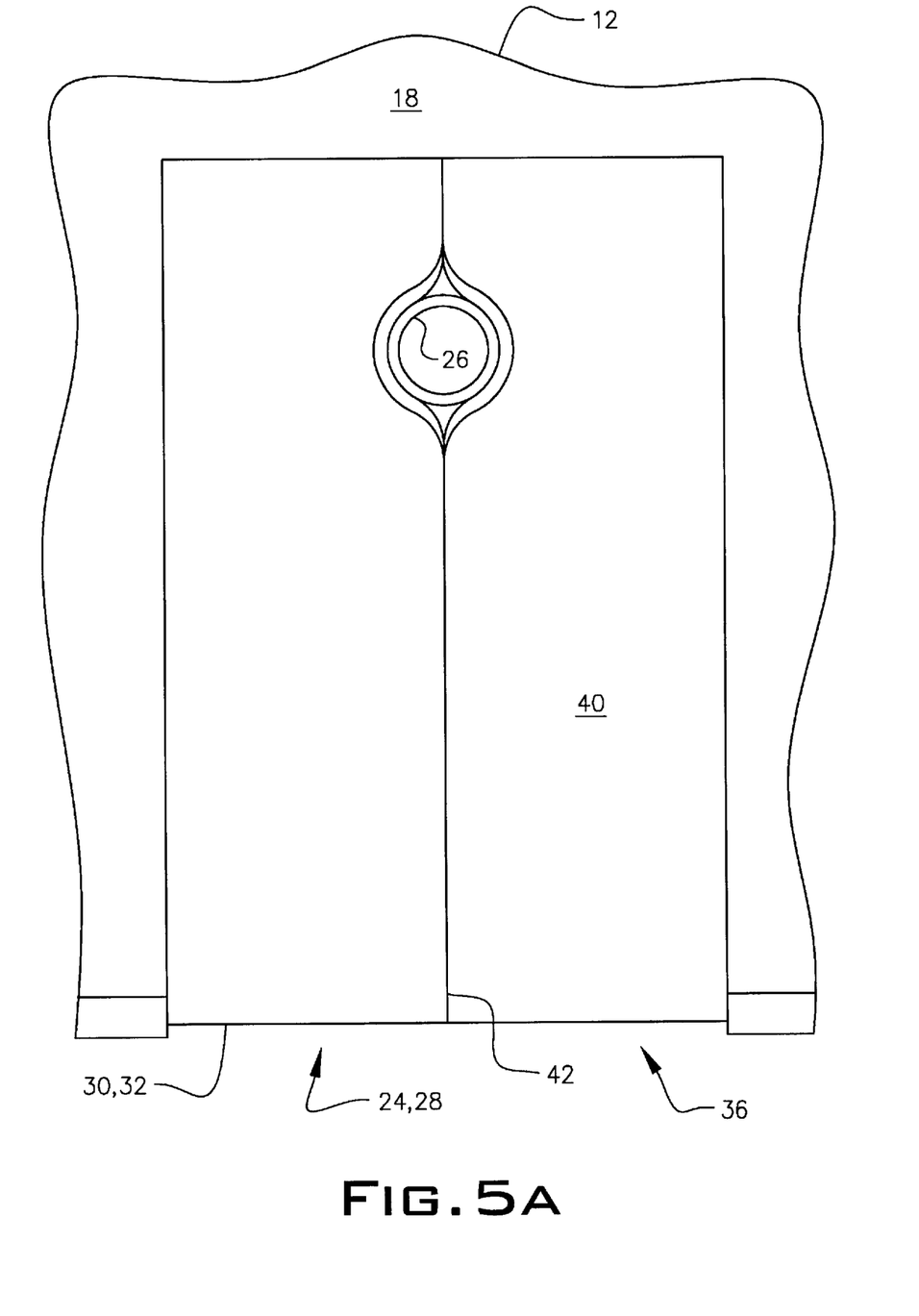
FIG. 5A is a conceptual depiction of another embodiment of the invention wherein the closure means for the inlet and outlet openings each uses a rubberized relatively stiffened sheet with a centrally located or intermediate vertical slit.

In another embodiment as shown in FIG. 5A, the closure means 36 comprises a sheet of elastomeric material 40 with a vertically oriented slit 42 at an intermediate location and extending from the bottom of the housing to a predetermined height. The centrally located or intermediate located slit 42 can extend up to near the upper edge of the openings 30,32. The elastomeric or rubberized sheet material 40 can be a laminated product that may include a woven fabric, or a polymer or fiber impregnated material, or a metallic material laminated between layers of rubber, each of suitable thickness and configuration to render the sheet stiff enough to prevent its collapse inwardly and thereby prevent soil from entering the box cavity 56. Another anticipated method of stiffening may be to have a flexible wire imbedded near the bottom edge of the elastomeric sheet 40 to help maintain the sheet as a curtain blocking out the movement of soil.

Figure 5B:
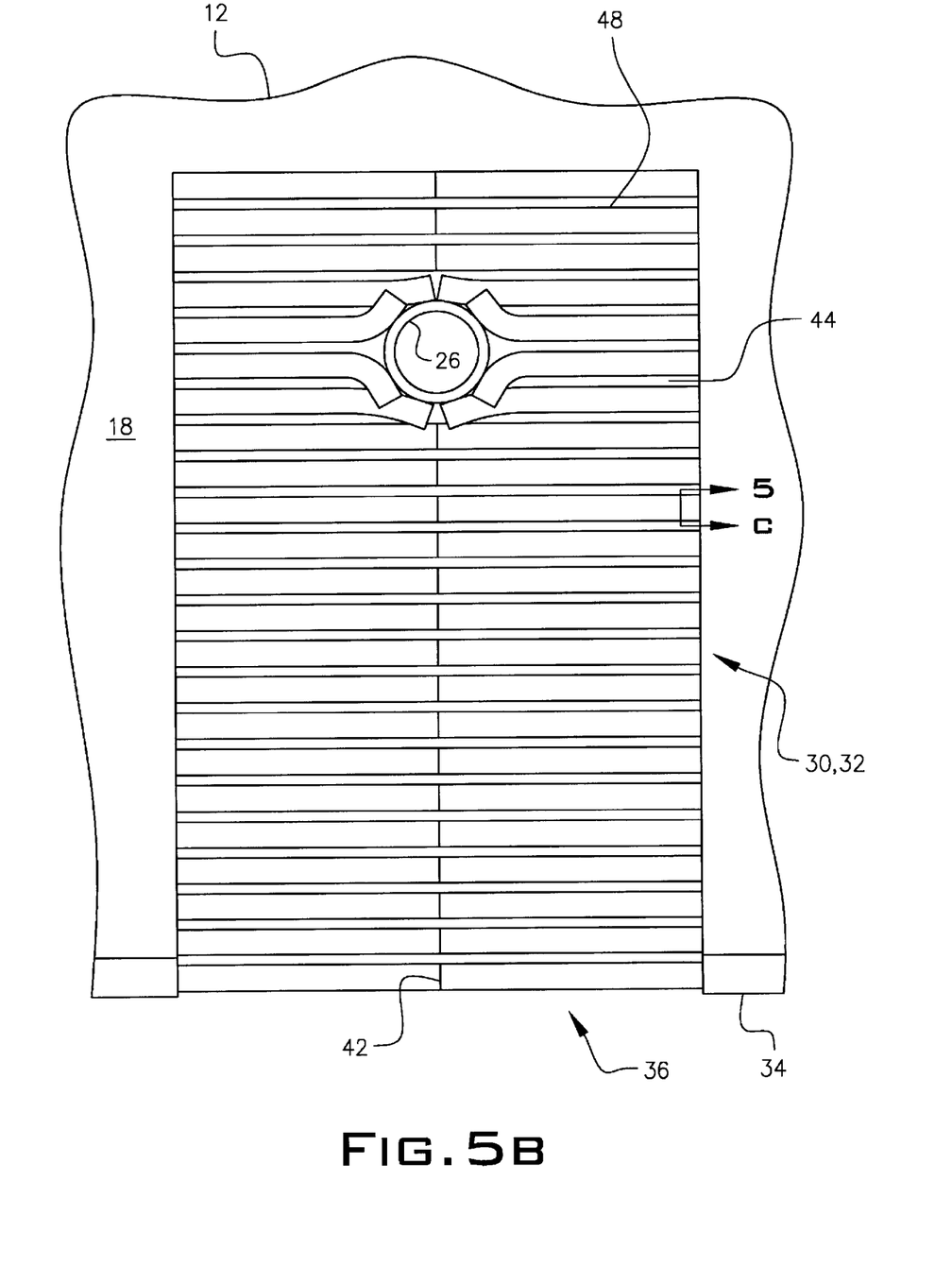
FIG. 5B is a conceptual depiction of another embodiment of the invention similar to that of FIG. 5A, except the closure means uses a rubberized sheet with preferable stiffened fingers formed by a series of lateral slits.
Figure 5C:
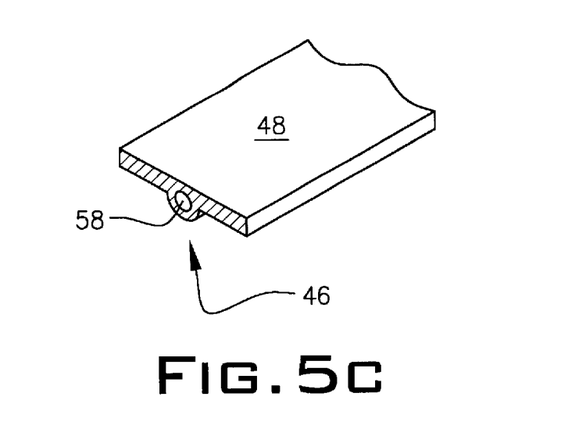
FIG. 5C is a cross-sectional exploded view of one method for providing stiffness to the formed rubberized fingers by using an integrally molded wire in the sheet of rubberized material.

FIG. 5B depicts still another embodiment of the invention, wherein the sheet of elastomeric material 40 further comprises a plurality of spaced-apart laterally oriented slits 44. In this embodiment, the elastomeric material 40 further comprises integral stiffening means 46 for maintaining the resultant plurality of elastomeric fingers 48 in a horizontal configuration. As depicted in FIG. 5C, one contemplated example of providing stiffening means 46, but not limited thereto, is the use of an imbedded wire or metallic strip 58 along the length of each formed finger 48.

As mentioned above, the underground utility housing can be made from a variety of materials including polymeric material, metallic material and combination thereof. If bristles 38 are used as closure means 36, these can be made from materials such as fiberglass material, polymeric material, metallic material and combinations thereof Although other materials such as thatch or straw such as that used in broom could be used, it preferable that such materials not be used as they may deteriorate when allowed to stay wet over an extended period.

The invention 10 as contemplated can be incorporated in larger utility boxes where multiple openings are required to accommodate multiple service lines entering and exiting the box. FIG. 6 is illustrative of such concept by showing two openings representative of at least two inlet openings 50 and/or two outlet openings 52. Certainly, more or less of each is contemplated in the present invention.

The inlet and outlet openings can be located in the upstanding wall portions 18 at any desired location and are typically aligned substantially opposite each other but may also be included on adjacent walls 18. In other cases, the inlet and outlet openings 30,32 may individually be made wide enough to be lowered over at least two utility service pipes entering and exiting the housing 12.

As alluded to above, it should be understood that the invention as contemplated will be designed with reinforcement in the upstanding wall portions 18 through which the openings 30,32 are located due to the size of the openings anticipated to be used by the invention. Such reinforcement is not shown in the drawings as one skilled in the art can easily design such reinforcement in the housing such as by using ribs or gussets, varying the thickness of the material used to cast or mold the box, increasing the base perimeter footprint load area to more evenly distribute above ground loads applied to the top of the box, etc.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

Now that the invention has been described,

What is claimed is:

1. An underground utility housing with a lid for access from above ground comprising:

a housing formed with upstanding wall portions defining a cavity having an upper opening and a bottom opening, said upper opening being formed to support and receive a removable lid;

the housing having utility piping inlet means in one of the upstanding wall portions through which the utility piping enters the housing and utility piping outlet means in another of the upstanding wall portions through which the utility piping exits the housing for servicing a facility;

the utility piping inlet and outlet means comprising respective openings formed so as to extend from a bottom edge of the housing; and the utility piping inlet and outlet means each having flexible closure means for preventing dirt around an exterior of the housing from entering the inlet and outlet means into the cavity formed by the housing's upstanding wall portions, the closure means further being sufficiently flexible for sliding down over said utility piping entering and exiting the housing yet sufficiently resilient to prevent the dirt from entering the housing cavity.

2. The underground utility housing according to claim 1, further comprising a removable lid temporarily engageable with the upper opening of the housing.

3. The underground utility housing according to claim 1, wherein the respective openings are approximately about 3 to 5 inches in width and extend upwardly to about 4 inches from an upper edge of the housing's upstanding wall portions.

4. The underground utility housing according to claim 1, wherein the closure means comprises a plurality of bristles fixed on each side of each opening, the bristles extending laterally toward the opposite side of each respective opening and being of sufficient length such that free ends of the bristles overlap the opposite directed bristles.

5. The underground utility housing according to claim 4, wherein the free ends of the bristles overlap each other by about 1½ inches.

6. The underground utility housing according to claim 1, wherein the closure means comprises a sheet of elastomeric material with a vertically oriented slit at an intermediate location and extending from the bottom of the housing to a predetermined height.

7. The underground utility housing according to claim 6, wherein the sheet of elastomeric material further comprises a plurality of spaced-apart laterally oriented slits, the elastomeric material further comprising integral stiffening means for maintaining the resultant plurality of elastomeric fingers in a horizontal configuration.

8. The underground utility housing according to claim 1, wherein the housing is made of material selected from the group consisting of polymeric material, metallic material and combination thereof.

9. The underground utility housing according to claim 4, wherein the plurality of bristles are made from material selected from the group consisting of fiberglass material, polymeric material, metallic material and combinations thereof.

10. The underground utility housing according to claim 1, wherein the utility piping inlet means includes at least two openings formed so as to extend from a bottom edge of the housing, said at least two openings formed so as to extend from a bottom edge of the housing and are sufficiently wide to accommodate and be lowered over utility service pipes entering the housing.

11. The underground utility housing according to claim 1, wherein the utility piping outlet means includes at least two openings formed so as to extend from a bottom edge of the housing, said at least two openings formed so as to extend from a bottom edge of the housing and are sufficiently wide to accommodate and be lowered over utility service pipes exiting the housing.

12. The underground utility housing according to claim 1, wherein the utility piping inlet means in the one of the upstanding wall portions through which the utility piping enters the housing and the utility piping outlet means in the other upstanding wall portion through which the utility piping exits are aligned substantially opposite each other.

13. The underground utility housing according to claim 1, wherein the respective openings are sufficiently wide to accommodate and be lowered over at least two utility service pipes entering and exiting the housing.

* * * * *